UNITED STATES PATENT OFFICE.

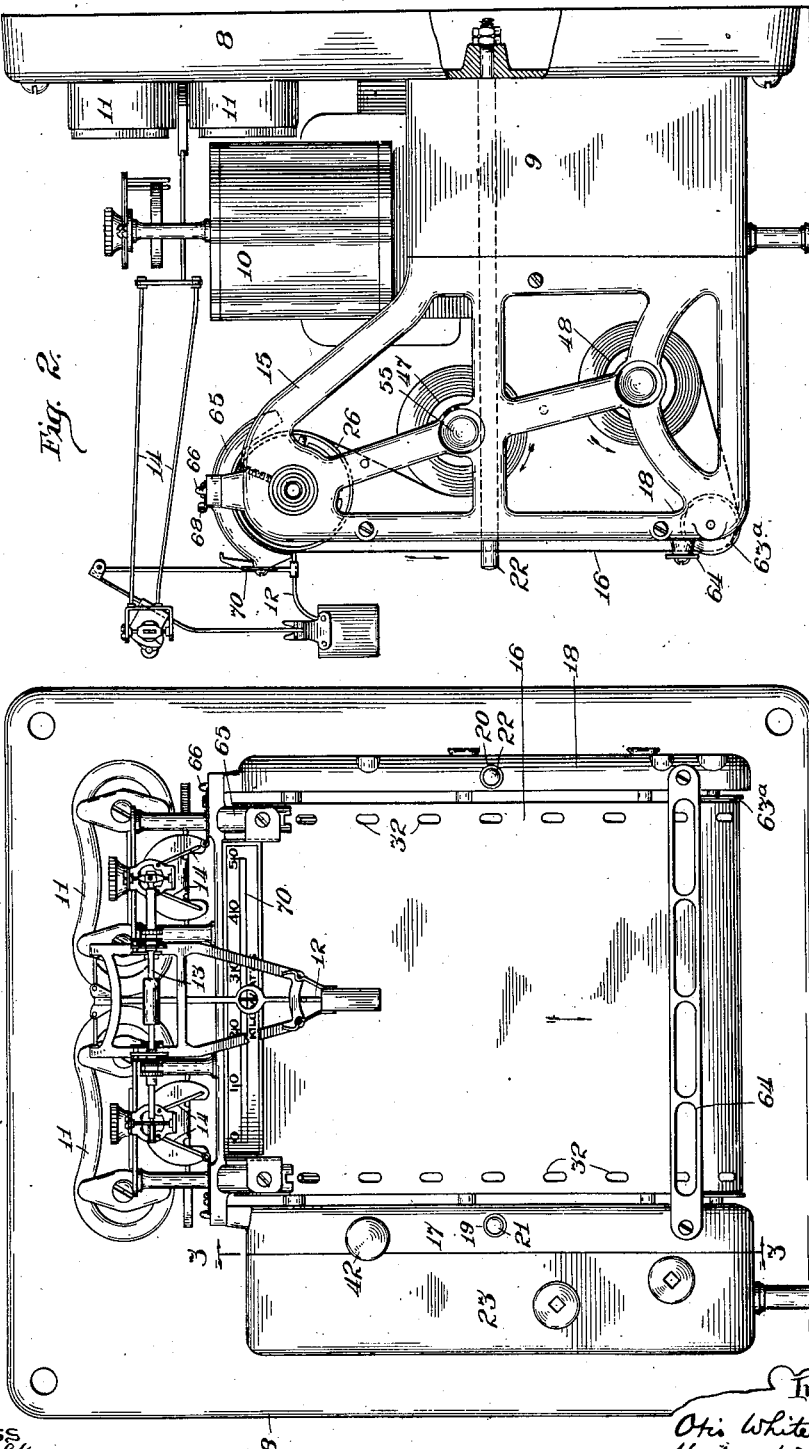

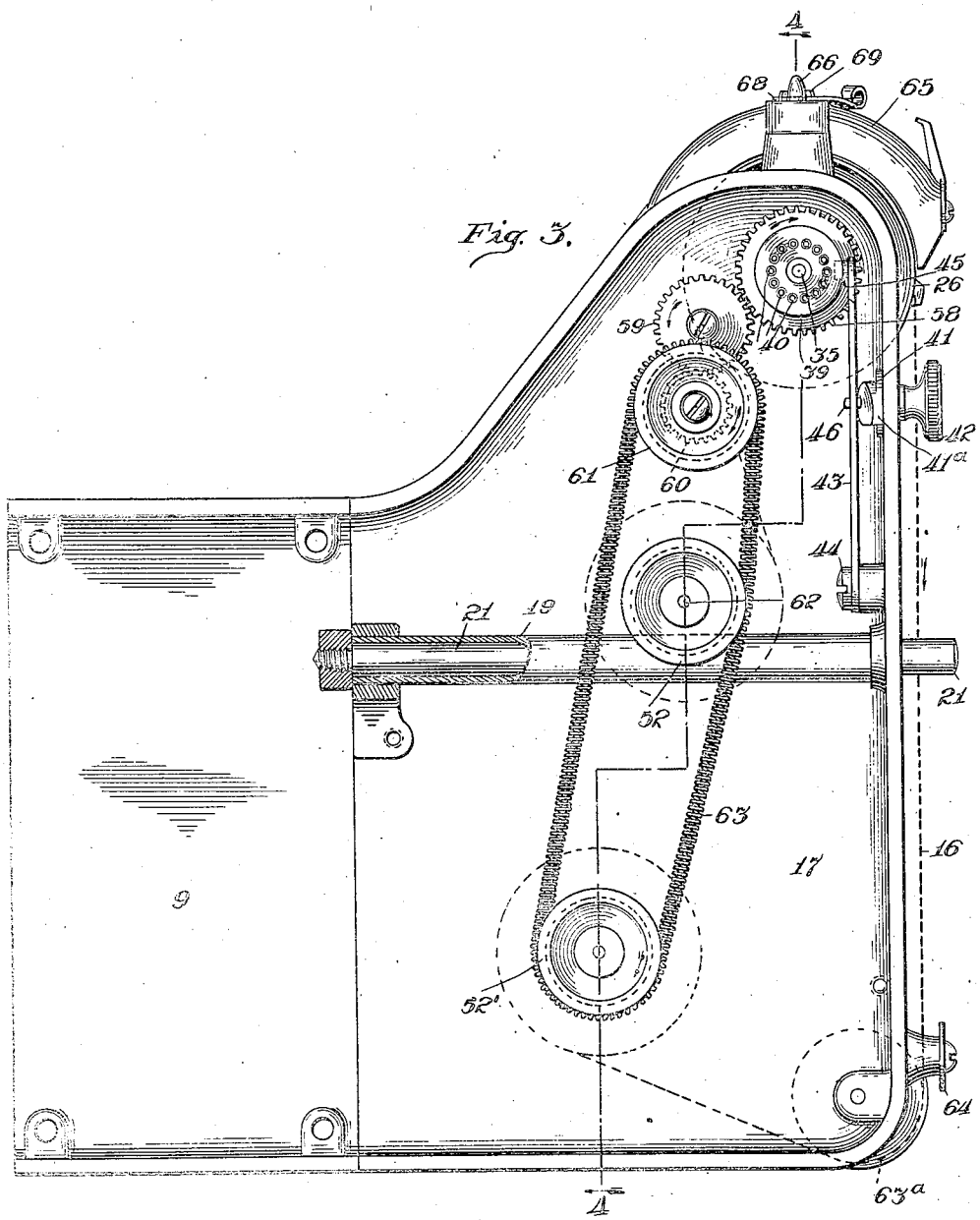

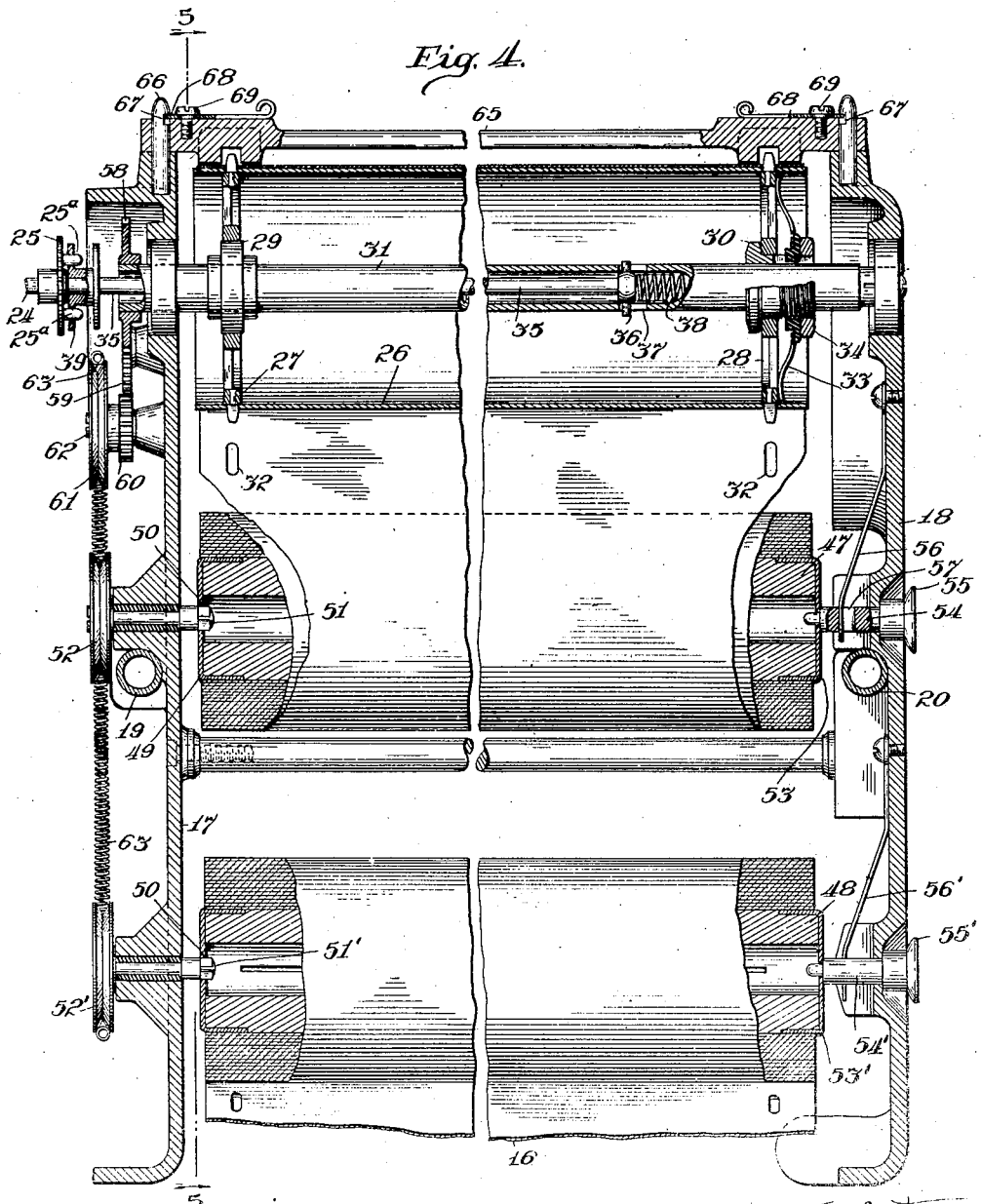

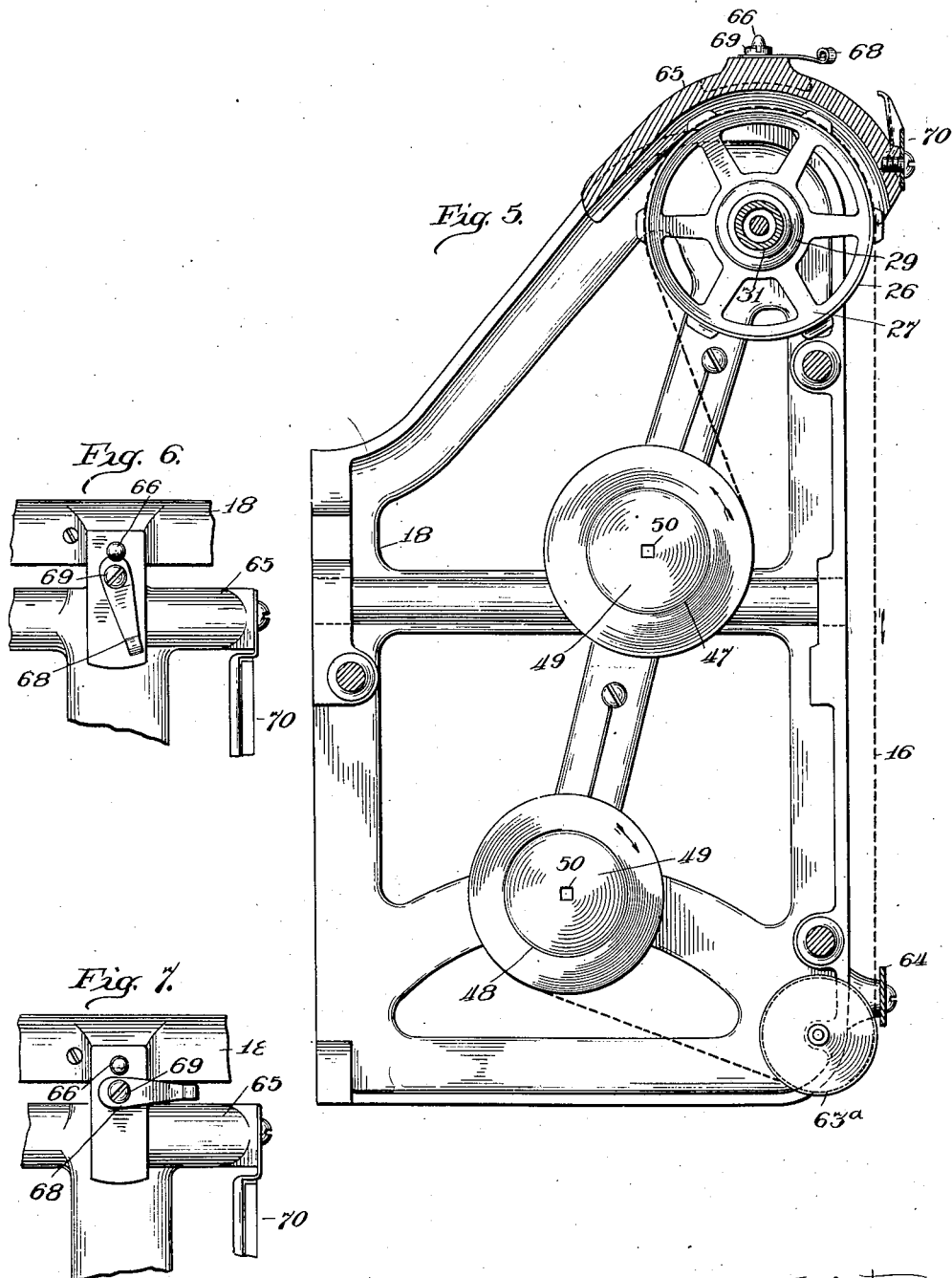

OTIS WHITE, OF SPRINGFIELD, AND HERBERT W. YOUNG, OF CHICAGO, ILLINOIS, ASSIGNORS TO SANGAMO ELECTRIC COMPANY, OF SPRINGFIELD, ILLINOIS, A CORPORATION OF ILLINOIS.

GRAPHIC RECORDING INSTRUMENT.

1,347,884.     Specification of Letters Patent.     Patented July 27, 1920.

Application filed October 14, 1916. Serial No. 125,730.

*To all whom it may concern:*

Be it known that we, OTIS WHITE, of Springfield, Sangamon county, State of Illinois, and HERBERT W. YOUNG, of Chicago, Cook county, State of Illinois, citizens of the United States, have invented certain new and useful Improvements in Graphic Recording Instruments, of which the following is a specification, reference being had to the accompanying drawings.

Our invention relates to graphic recording instruments of that type in which fluctuations or variations of force are recorded by a stylus on a moving sheet or chart in the form of a more or less irregular line, so that by using a chart ruled according to a predetermined standard a visible record is obtained showing exactly the character and extent of such fluctuations. A graphic recording instrument of this type is shown and described in Letters Patent No. 992,010, granted May 9, 1911, to Robert C. Lanphier,—the instrument shown and described in that patent being one designed to record variations such as of quantity and pressure in electric circuits of various kinds. In the instrument of that patent the stylus is arranged to move across and parallel with the surface of a chart which travels perpendicularly to the path of the stylus, and to provide for such movement it is supported between two pivotally-mounted arms arranged to swing in parallelism with each other, the swinging of such arms being dependent upon or controlled by two electrically-operated motor elements, preferably of the mercury motor type, all of which is set forth in said patent. The improvements which form the subject-matter of this application have to do particularly with the devices for supporting and moving the chart on which the record is made by the stylus of a graphic recording instrument, and the embodiment of our invention illustrated in the accompanying drawings has been designed with special reference to its association with the other parts going to make up a graphic recording instrument of the general type shown and described in said Lanphier patent; but we wish it to be understood that certain of the improvements described and claimed herein are capable of being employed in connection with forms of record making devices other than a stylus such as that shown and described in said patent, or with a record making device actuated by motor mechanism different from that shown and described in said patent.

Among the objects of our invention are to provide a graphic recording instrument with means for holding a chart in the form of a roll of paper and for moving such chart regularly past the point of the stylus and then rewinding it upon another roll so that it may be conveniently preserved; also to provide a chart-holding frame separable with its rolls from the motor mechanism by which the progressive movement of the chart is effected and also separable from the recording instrument as a whole, so that the chart-holding frame with its chart may be removed easily and without dismantling the instrument; also to provide for maintaining the chart under proper tension; to provide for readily removing one or both rolls; and to provide for adjusting the chart without disconnecting it from the motor mechanism by which it is driven. Another important object is to provide for locking the chart-holding frame in operative relation to the rest of the instrument and simultaneously and automatically connecting the chart-supporting devices with the motor mechanism by which the chart is driven when the chart-holding frame is locked in operative position, and for automatically disconnecting the driving devices before the chart-holding frame is unlocked from the rest of the instrument. A still further important object is to provide the chart-holding frame with an indicating scale which also serves as a guard for the chart and is readily removable so that the chart can be more easily removed and replaced. We accomplish these objects as illustrated in the drawings and as hereinafter described. That which we regard as new is set forth in the claims.

In the accompanying drawings,—

Figure 1 is a front elevation of a graphic recording instrument of the general type shown and described in said Lanphier patent, having our improvements applied thereto;

Fig. 2 is a side elevation of the instrument;

Fig. 3 is an enlarged side view of the left-hand side of the instrument as shown in Fig. 1, the motor mechanism and the housing therefor being removed, the line of separation being indicated by the line 3—3 on Fig. 1;

Fig. 4 is an enlarged partial vertical section on line 4—4 of Fig. 3, looking to the left certain parts being broken away;

Fig. 5 is a vertical section on line 5—5 of Fig. 4; and

Figs. 6 and 7 are enlarged details illustrating in plan view the locking devices by which the guard which carries the indicating scale is secured in place.

Referring to the drawings,—

8 indicates the base of the instrument, which is designed to be secured in a vertical position to any suitable support. 9 indicates a frame or housing, which is fixedly secured to or made integral with the base 8 and supports the motor elements 10 which operate the stylus. The base 8 also carries damping magnets 11, as shown in Figs. 1 and 2. 12 indicates the stylus, which is suspended intermediately from a cross-bar or link 13 which connects two laterally-swinging substantially horizontal arms 14 which are actuated by the motor elements 10 which are energized by the force, such as an electric current, the fluctuations or variations of which are to be recorded by the stylus. The several parts of the instrument are so adjusted that normally the stylus 12 is held near one side margin of the chart so that the energization of the motor elements by which this movement is controlled operates to move the stylus across the face of the chart. In the illustrated construction the normal position of the stylus is near the left-hand margin of the chart. The construction of the motor elements, the stylus, the supporting arms therefor, and the manner of mounting the damping magnets need not be more specifically described herein because they are not of our joint invention, and will form the subject-matter of separate applications for patent by the inventors thereof.

15 indicates the chart-holding frame, and 16 indicates the chart on which the record is made. As best shown in Fig. 1, the chart is of considerable width, it being made wide enough to give the stylus a range of movement laterally which will suffice for all ordinary requirements an instrument of this kind may have to meet, and the chart-holding frame is sufficiently wider than the chart to properly receive and support it. As shown in Fig. 2 said chart holding frame projects from the front of the base 8, fitting against the housing 9, and the chart extends over its outer or front side, so that its exposed surface lies away from and is parallel with the base. 17 indicates one of the side members of the chart-holding frame, and 18 the opposite side member. These side members are secured together in any suitable way and are provided with sleeves 19—20, which extend fore and aft, as shown in Figs. 3 and 4, and are adapted to fit upon parallel rods 21—22, respectively, secured to the base 8 and projecting forward therefrom horizontally as shown in Figs. 2 and 3. These rods serve to position the chart-holding frame with reference to the housing 9 and not only guide said frame when it is being applied to or removed from the base, but also help to hold it in position. The chart-holding frame is further supported and held in position by a frame or housing 23 which is fixedly secured to the base at one side of the chart holding frame and is shaped to conform to the shape of the side member 17 of said frame which fits closely against it and forms a closure for it, as best shown in Fig. 1. This housing 23 contains chronometrically-controlled motor mechanism for driving the chart, but as such motor mechanism, so far as its specific construction is concerned, forms no part of our joint invention, it has not been thought necessary to illustrate it, and so far as our present invention is concerned any suitable chronometrically-controlled motor arranged to be connected to or disconnected from the chart-holding frame in the manner and for the purpose hereinafter described may be employed. In Fig. 4 we have shown a shaft 24, which may be considered as representing the chronometrically-controlled motor, said shaft having a clutch-member 25 having laterally-projecting pins 25ª by means of which connection is made between said motor and the chart-supporting devices, as will be hereinafter fully explained. 26 indicates a cylindrical platen which extends across the chart-carrying frame at the upper portion thereof and is carried by sprocket-wheels 27—28 loosely mounted upon collars 29—30, respectively, which are in turn loosely mounted upon a sleeve 31 which extends across from the side member 17 to the side member 18 of the chart-carrying frame, being suitably journaled so that it is free to rotate. The teeth of the sprocket-wheels 27—28 project through the platen 26 and through suitable perforations 32 near the longitudinal margins of the chart, as best shown in Fig. 4. The sprocket-wheel 28 is operatively connected with the sleeve 31 by means of a friction clutch-member 33, as best shown in Fig. 4, which is non-rotatably mounted on the sleeve 31 and is adapted to bear against one side of the sprocket-wheel 28 with more or less force, its pressure being determined by a nut 34 secured upon the hub 30 and arranged to move the hub portion of the clutch-member 33 toward or from the sprocket-wheel 28. The clutch-member 33 is preferably made of elastic material, such as spring metal, and the arrangement is such that the sprocket-wheel 28 may easily be slipped with reference to the clutch-member 33 so that the platen 26 may be rotated for adjusting purposes independently of the sleeve 31. Ordinarily, however, the platen 26 rotates with said sleeve.

The sleeve 31 is driven from the motor, represented by the shaft 24, and is detachably connected therewith by means of a shaft 35 placed within the sleeve 31 and non-rotatably connected therewith by a cross-pin 36 fitted in the inner end of said shaft and lying in longitudinal slots 37 in the sleeve 31. Thus the shaft 35 has a limited longitudinal movement in said sleeve. It is normally pressed toward the left, as shown in Fig. 4, by a spring 38 which is fitted in the sleeve 31 and bears against the inner end of said shaft. The outer end of the shaft 35 carries a grooved collar 39, the outer face of which is provided with a series of holes 40, as shown in Fig. 3. The outer face of said collar is adapted to register with the clutch-member 25, and the pins 25ᵃ carried by said clutch-member are adapted to enter two diametrically opposite holes 40 in the collar 39. The collar 39 therefore forms a clutch-member which coöperates with the clutch-member 25 to lock the shaft 35 and sleeve 31 to the motor shaft 24. They may, however, be disconnected by moving the shaft 35 inward far enough to separate the collar 39 from the pins 25ᵃ. When the chart-holding frame is in operative relation to the other parts of the instrument, as shown in Fig. 1, it is locked in such position by means of a cam 41 carried by a knob 42 mounted in the front portion of the side member 17, the cam 41 bearing against the inner wall of said side member, as shown in Fig. 3. This cam has a flattened portion 41ᵃ which may be brought into registration with the margin of the side member 17, at which time the chart-holding frame is unlocked from the housing 23. By rotating the knob 42 to move the flat portion 41ᵃ of the cam 41 out of alinement with the margin of said frame, the cam will overlap the inner margin of the housing 23 and thereby lock the chart-holding frame in position. In order to prevent the chart-holding frame from being moved so long as the collar 39 is interlocked with the motor shaft 24, we provide a swinging arm 43 pivoted at 44 to the side member 17 and extending up over the grooved collar 39 where it is provided with a pin 45 which enters said groove, as shown in Fig. 3. The knob 42 carries a pin 46 which projects inwardly from the cam 41, as shown in said figure, and enters a suitable slot (not shown) in the arm 43. Thus by rotating the knob 42 the arm 43 may be swung about its pivot, thereby moving the shaft 35 endwise to connect or disconnect said shaft and the motor shaft 24. The locking cam 41 and pin 46 are so placed with reference to each other that when the flat portion 41ᵃ of said cam registers with the margin of the chart-holding frame the arm 43 is in position to hold the collar 39 out of engagement with the pins 25ᵃ. When, however, the knob 42 is rotated to lock the chart-holding frame in position, the same operation swings the arm 43 so as to move the collar 39 into engagement with the pins 25ᵃ, thereby operatively connecting the sleeve 31 and the platen 26 with the motor shaft 24. This construction makes it impossible for the chart-holding frame to be removed from or applied to the stationary part of the instrument except after the shaft 35 has been retracted so as to disconnect it from the motor shaft 24.

47—48 indicate two rollers which are mounted between the side members 17—18 of the chart-holding frame. The roller 47 is designed to carry the fresh portion of the chart, and the roller 48 is the rewinding roll upon which the used portion of the chart is wound after it has passed down over the front portion of the frame. Both these rollers are detachably mounted in position and are readily accessible when the chart-holding frame is separated from the rest of the instrument. As shown in Figs. 4 and 5, the roller 47 is provided at one end with a metal cap 49 having a non-circular central socket 50 which receives the correspondingly shaped inner end of a pin 51 rotatably mounted in the side member 17. This pin is provided at its outer end with a grooved pulley 52. The opposite end of the roller 47 is also provided with a cap 53 having a circular socket which receives a pin 54 movable longitudinally in a suitable socket in the side member 18 and having a head 55 at its outer end by which it may be readily drawn out. The pin 54 is normally held in its innermost position by a spring 56, as best shown in Fig. 4, which, in the construction shown, is secured at one end to the side member 18, its other end projecting into a slot 57 in the pin 54. Thus, by drawing out the pin 55, the roller 47 may be slipped to the right so as to disengage the pin 51, whereupon the roller is free and may be removed from the chart-holding frame. The roller 48 is mounted in the same way, and the corresponding parts are given the same reference numerals with the addition of a prime.

The rewinding roller 48 is driven from the motor shaft 24 by means of a pinion 58 carried by the sleeve 31. Said pinion, through a train of gears composed of pinions 59—60, shown in Fig. 3, drives a grooved pulley 61 mounted on a pivot 62 which also carries the pinion 60. A belt 63 runs over the pulleys 61 and 52′, as shown in Fig. 3, so that the rewinding roller is driven from the pulley 61. The belt 63 is preferably a spring belt, and the pulley 52 is set a little out of line with the pulleys 61 and 52' so as to deflect slightly that side of said belt which is moving in a direction opposite to that in which said pulley rotates in unwinding the chart, as indicated by the arrows in Fig. 3. It will be apparent that the rotation of the shaft 35 and the platen 26 will cause the roller 47 to unwind as the chart is drawn from it by the sprockets which project through the platen and engage the marginal holes in the chart. This causes the pulley 52 to rotate in the direction indicated by the arrow in Fig. 3, and as that part of the belt 63 which engages said pulley is moving in the opposite direction, it applies frictional resistance to the rotation of said pulley, and consequently forms a brake which keeps that part of the chart between the roller 47 and the platen under proper tension. The chart passes down over the front of the platen and a roller 63ª at the lower front portion of the chart-holding frame, as shown in Fig. 5, and then passes to the rewinding roller 48, upon which it is rewound. 64 indicates a guard strip which extends across the chart-holding frame opposite the guide roller 63ª, as shown in Figs. 1 and 5.

65 indicates a combined guard and indicating scale which is secured upon the upper forward portion of the chart-holding frame and extends transversely thereof, as shown in Figs. 4 and 5. As shown, said guard is in the form of a curved plate which overlies the platen 26, its ends being perforated to fit upon vertical pins 66 secured in the side members 17—18 of the chart-holding frame, as shown in Fig. 4. These pins are provided with inwardly-faced slots 67, flush with the upper surface of the guard 65, to receive the end portions of latches 68 mounted upon pivots 69, as shown in Figs. 4, 6 and 7. When the latches 68 are disposed longitudinally of the guard, they engage the notches 67 and lock the guard in position as shown in Figs. 4 and 6. By turning the latches to an angular position, as shown in Fig. 7, the guard is released and may be removed. Said guard carries an indicating scale 70, in the form of a plate, which extends across the chart-holding frame at the upper front portion thereof so as to lie in front of the chart. Said scale is graduated preferably as shown in said Fig. 1 to indicate kilowatts, starting with 0 at the left-hand margin of the chart,—the instrument being so adjusted that when the motor elements which actuate the stylus-supporting devices are not energized the stylus stands near the left-hand margin of the chart opposite the indication 0, and such motor elements, when energized, operating to move the stylus to the right, as has been explained, it will be apparent that by properly calibrating the indicating scale the position of the stylus will correctly register on the scale the force applied through the motor elements. This indication will be graphically recorded by the stylus on the moving chart. By using a ruled chart a permanent record is obtained which may at any time be read at a glance.

If for any reason it should be desired to adjust the chart without disconnecting the platen from the motor, the platen may be rotated by hand independently of the sleeve 31, as the connection between the platen and said sleeve is a frictional one and not positive. If desired, instead of rewinding the chart, the paper may be allowed to drop straight down inside the guard 64 at the bottom of the chart-holding frame, as said guard will hold the free end of the paper in place.

We wish it to be understood that although we have described with considerable particularity the embodiment of our invention illustrated in the accompanying drawings, our invention is not restricted to the specific details of the construction shown and described, except in so far as they are particularly claimed, but includes generically the subject-matter of the broader claims.

That which we claim as our invention, and desire to secure by Letters Patent, is,—

1. In a graphic recording instrument, a base, a chart-holding frame detachably connected with said base, a motor supported by said base at one side of said chart-holding frame, chart-supporting means carried by said frame, a separable driving connection between said motor and said chart-supporting means, means for locking said chart-holding frame in operative relation to the base, and means associated with said locking means and operated by the locking of said frame in operative position for automatically connecting said motor with said chart-supporting means.

2. In a graphic recording instrument, a base, a chart-holding frame detachably connected with said base, a motor supported by said base at one side of said chart-holding frame, chart-supporting means carried by said frame, a separable driving connection between said motor and said chart-supporting means, means for locking said chart-holding frame in operative relation to the base, and means associated with said locking means for automatically disconnecting said motor from said chart-supporting means when said chart-holding frame is unlocked from the base.

3. In a graphic recording instrument, a base, a chart-holding frame detachably connected with said base, a motor supported by said base at one side of said chart-holding frame, chart-supporting means carried by said frame, a separable driving connection between said motor and said chart-supporting means, means for locking said chart-holding frame in operative relation to the base, and mechanism associated with said locking means for automatically connecting the motor with the chart-supporting means when said chart-holding frame is locked in operative position and for disconnecting the motor from the chart-supporting means when the chart-holding frame is unlocked.

4. In a graphic recording instrument, a frame, sprocket-wheels mounted in said frame, chart carrying rollers mounted in said frame and coöperating with said sprocket-wheels to advance a chart, a cylindrical platen mounted on said sprocket-wheels, means for applying power to said sprocket-wheels to advance the chart, and a belt operatively connecting said rollers and the platen and acting to frictionally oppose the rotation of one of said rollers.

5. In a graphic recording instrument, a frame, a rotary cylinder, chart supporting rollers mounted in said frame, one of said rollers being arranged to feed a chart to the cylinder and the other to rewind the chart as it comes from the cylinder, and a belt operatively connecting the cylinder with the rewinding roller and acting as a brake on the feed roller.

6. In a graphic recording instrument, a frame, a rotary cylinder, chart supporting rollers mounted in said frame, one of said rollers being arranged to feed a chart to the cylinder and the other to rewind the chart as it comes from the cylinder, a belt operatively connecting the cylinder with the rewinding roller and acting as a brake on the feed roller, and friction clutch mechanism for applying power to said cylinder to rotate the same.

7. In a graphic recording instrument, a frame, a cylinder rotatably mounted in said frame, chart carrying rollers mounted in said frame, one of said rollers being arranged to feed a chart to said cylinder and the other to rewind said chart, pulleys connected respectively with said cylinder and rollers, and a belt running over said pulleys and acting as a brake on the pulley connected with said feed roller.

8. In a graphic recording instrument, a base, a motor carried by said base, a frame adapted to be operatively associated with said base and motor and separately removable therefrom, a chart moving cylinder mounted on said frame, a shaft axially disposed with reference to said cylinder and movable longitudinally into or out of operative engagement with said motor, and means connecting said shaft with said cylinder for rotating the same.

9. In a graphic recording instrument, a base, a motor carried by said base, a frame adapted to be operatively associated with said base and motor and separately removable therefrom, a chart moving cylinder mounted on said frame, a shaft axially disposed with reference to said cylinder and movable longitudinally into or out of operative engagement with said motor, means connecting said shaft with said cylinder for rotating the same, chart carrying rollers mounted in said frame, and means for rotating one of said rollers to rewind the chart.

10. In a graphic recording instrument, a base, a motor carried by said base, a frame adapted to be operatively associated with said base and motor and separately removable therefrom, a chart moving cylinder mounted on said frame, a shaft axially disposed with reference to said cylinder and movable longitudinally into or out of operative engagement with said motor, and a friction clutch connecting said shaft with said cylinder for rotating the same.

11. In a graphic recording instrument, a base, a motor mounted on said base, a frame detachably connected with the base, a chart carrying cylinder mounted on said frame, a shaft axially disposed with reference to said cylinder and movable longitudinally into and out of operative engagement with said motor, a lock for connecting said frame with said base, means connected with said lock for automatically moving said shaft longitudinally to connect the same with said motor when the frame is locked and to disconnect said shaft from the motor when the frame is unlocked, and means for driving said cylinder from said shaft.

12. In a graphic recording instrument, a base, a motor mounted on said base, a frame detachably connected with the base, a chart carrying cylinder mounted on said frame, a shaft axially disposed with reference to said cylinder and movable longitudinally into and out of operative engagement with said motor, a lock for connecting said frame with said base, means connected with said lock for automatically moving said shaft longitudinally to connect the same with said motor when the frame is locked and to disconnect said shaft from the motor when the frame is unlocked, and friction clutch mechanism for driving said cylinder from said shaft.

OTIS WHITE.
HERBERT W. YOUNG.